US009025958B1

(12) United States Patent
Ketelsen et al.

(10) Patent No.: US 9,025,958 B1
(45) Date of Patent: May 5, 2015

(54) PLANAR LIGHTWAVE CIRCUIT OPTICAL MULTIPLEXER FOR NON-SEQUENTIAL WAVELENGTH CHANNELS

(71) Applicant: Avago Technologies General IP (Singapore) Pte. Ltd., Singapore (SG)

(72) Inventors: Leonard Jan-Peter Ketelsen, Clinton, NJ (US); Julian Bernard Donald Soole, Edison, NJ (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 67 days.

(21) Appl. No.: 14/016,716

(22) Filed: Sep. 3, 2013

(51) Int. Cl.
*H04J 14/02* (2006.01)
*G02B 6/34* (2006.01)

(52) U.S. Cl.
CPC .. *H04J 14/02* (2013.01); *G02B 6/34* (2013.01)

(58) Field of Classification Search
None
See application file for complete search history.

(56) References Cited

U.S. PATENT DOCUMENTS

| | | | |
|---|---|---|---|
| 4,852,960 A | 8/1989 | Alferness et al. | |
| 4,923,271 A | 5/1990 | Henry et al. | |
| 5,002,350 A | 3/1991 | Dragone | |
| 5,136,671 A | 8/1992 | Dragone | |
| 6,243,178 B1 * | 6/2001 | Suemura et al. | 398/56 |
| 6,263,127 B1 | 7/2001 | Dragone et al. | |
| 6,351,583 B1 | 2/2002 | Bergmann et al. | |
| 6,603,781 B1 | 8/2003 | Stinson et al. | |
| 6,694,102 B2 | 2/2004 | Baumann et al. | |
| 6,956,993 B2 | 10/2005 | Bernasconi | |
| 6,993,258 B2 | 1/2006 | Payne et al. | |
| 7,085,446 B2 | 8/2006 | Hatayama | |
| 7,184,621 B1 | 2/2007 | Zhu | |
| 7,352,968 B2 | 4/2008 | Tayebati et al. | |
| 7,623,788 B2 | 11/2009 | Takahashi et al. | |
| 7,661,889 B2 | 2/2010 | Zhu et al. | |
| 7,715,671 B2 | 5/2010 | Fondeur et al. | |
| 8,000,607 B2 | 8/2011 | Hsieh | |
| 8,018,303 B2 * | 9/2011 | Handtmann et al. | 333/189 |
| 2003/0053171 A1 | 3/2003 | Baumann et al. | |
| 2004/0091268 A1 | 5/2004 | Hogan et al. | |
| 2009/0110014 A1 | 4/2009 | Miller et al. | |
| 2011/0038631 A1 | 2/2011 | Doerr | |
| 2012/0087667 A1 | 4/2012 | Bulthuis | |
| 2012/0189323 A1 | 7/2012 | Xu et al. | |
| 2012/0207474 A1 | 8/2012 | Inoue et al. | |

(Continued)

OTHER PUBLICATIONS

Cheben et al., "A high-resolution silicon-on-insulator arrayed waveguide grating microspectrometer with sub-micrometer aperture waveguides", Mar. 5, 2007/vol. 15, No. 5/Optics Express 2299-2306.

(Continued)

*Primary Examiner* — Andrew Jordan (57) ABSTRACT

A wavelength division multiplexer utilizes an optical source in the form of at least two separate laser array components, each laser array component including a group of laser diodes operating at wavelengths that are spaced by a multiple of the pre-defined channel spacing of the multiplexer. This optical source thus generates a plurality of non-sequential optical signals that need to be re-ordered at some point along the signal path so that all of the signals are multiplexed onto a single output signal path. The multiplexer utilizes an arrayed waveguide grating (AWG) to combine the various optical signals, with a specialized apparatus for re-ordering the non-sequential wavelengths of the propagating plurality of N optical signals disposed either at the input or output of the AWG.

21 Claims, 6 Drawing Sheets

(56) References Cited

U.S. PATENT DOCUMENTS

2012/0251047 A1    10/2012   Nara
2013/0011098 A1     1/2013   Kato et al.

OTHER PUBLICATIONS

Harmsma et al., "Three-port interferometer in silicon-on-insulator for wavelength monitoring and displacement measurement".

Pozo et al., "Silicon on Insulator Photonic Integrated Sensors: On-Chip Sensing and Interrogation", ICTON 2011, IEEE, pp. 1-4.

Soldano et al., "Optical Multi-Mode Interference Devices Based on Self-Imaging: Principles and Applications", Journal of Lightwave Technology, vol. 13, No. 4, Apr. 1995, pp. 615-627.

\* cited by examiner

PLANAR LIGHTWAVE CIRCUIT OPTICAL MULTIPLEXER FOR NON-SEQUENTIAL WAVELENGTH CHANNELS

TECHNICAL FIELD

The present invention relates to a planar lightwave circuit (PLC) optical multiplexer and, more particularly, to a PLC multiplexer based on an arrayed waveguide grating (AWG) that accepts inputs from multiple laser array components.

BACKGROUND OF THE INVENTION

The need for wavelength division multiplexers (WDMs) in today's laser-based transmission systems is well known. The ability to use multiple, different wavelengths to carry data signals, and then multiplex these separate data signals onto a single optical waveguide is useful.

Multiplexer arrangements have been developed that utilize an arrayed waveguide grating (AWG) device. An AWG is a planar structure comprising an array of waveguides that are positioned in a side-by-side configuration, with the array disposed between input and output couplers. These components then act together as a diffraction grating in a spectrometer. Each of the waveguides differs in length with respect to its nearest neighbor by a predetermined amount. In operation as a multiplexer, a plurality of separate and distinct wavelengths is applied to separate and distinct input ports of the device. These wavelengths are combined as they pass through the structure, exiting at a single output port. The signals need to be presented at the input in a monotonic sequence (either increasing or decreasing in wavelength value) so that all of the signals will appear at the single output port. The same device may be used as a demultiplexer, with a single waveguide supporting a plurality of signals operating at different wavelengths introduced to the "single port" of the device (the outputs then appearing at the plurality of separate and distinct ports at the other device termination, again the output signals appearing in monotonic wavelength sequence).

In situations where a monolithic array of laser diodes (each diode operating at a different wavelength) is used to provide a multiplexer input to the AWG, this monotonic wavelength sequence limitation necessitates that each separate laser diode forming the array be operating at its defined wavelength value within a given tolerance level (e.g., ±2-3 nm, at most). If the fabrication process results in only one wavelength value falling outside of this tolerance, the entire monolithic array must be discarded, incurring a significant expense.

Further, the desire to provide hybrid integration of laser arrays with optical multiplexers for packaged WDM components has presented difficulties in terms of the yield of acceptable arrangements. In particular, wavelength registration of the laser array and the optical multiplexer to the WDM grid as set by industry standards is critical (e.g., the ITU grid standard, which is an inter-channel spacing of 100 GHz). Wavelength registration is determined by fabrication tolerances of both the laser and the multiplexer. However, the fabrication capability is not sufficiently advanced to guarantee perfect wavelength registration to the ITU grid. While this is a problem for both the lasers and the multiplexers, the ability to provide laser diodes with the specific inter-channel spacing is more difficult. Past attempts at improving yield of the hybrid integration of laser arrays and optical multiplexers have involved activities such as "binning" the as-fabricated laser arrays and/or using temperature tuning of the individual laser diodes forming the array to modify the center wavelength values of each laser source. However, temperature tuning is limited by device performance and power consumption. Moreover, as the array ages, it may not be able to use temperature tuning to maintain an operational set of wavelength values.

These and other complications and drawbacks have thus limited the abilities to integrate laser arrays and multiplexers in a hybrid structure, as preferred for advanced packaging arrangements.

SUMMARY OF THE INVENTION

The needs remaining in the prior art are addressed by the present invention, which relates to a planar lightwave circuit (PLC) optical multiplexer and, more particularly, to a PLC multiplexer based on an arrayed waveguide grating (AWG) that accepts inputs from multiple laser array components in a manner that relaxes the tolerances on the individual laser arrays and permits hybrid integration of the laser arrays with the multiplexer components.

In accordance with one embodiment of the present invention, at least two separate laser arrays are used, with each laser array configured to exhibit multiple-channel spacing between adjacent laser diodes forming the array. For example, two separate laser arrays may be used in one exemplary configuration, with the multiple-channel spacing between adjacent laser diodes on an array being "two channels"—that is, double the channel spacing as used in a prior art single array arrangement. In particular, in a defined system using a plurality of N laser sources operating at $\lambda_1, \lambda_2, \ldots, \lambda_N$ ($\lambda_1 < \lambda_2 < \ldots < \lambda_N$) with a defined spacing between adjacent wavelengths ("channels"), an arrangement of the present invention re-groups the laser sources into two separate arrays, each formed as a separate monolithic component. That is, the "odd" wavelength channels ($\lambda_1, \lambda_3, \lambda_5 \ldots$) are formed as a first multiple-channel-spaced array and the "even" wavelength channels ($\lambda_2, \lambda_4, \lambda_6 \ldots$) are formed as a second multiple-channel-spaced array. Thus, if there are any manufacturing variations that shift the resultant wavelengths of, for example, an exemplary "odd array", it may instead be useable as an "even array" (and not discarded, as was the practice of the prior art).

Further, the PLC multiplexer of the present invention functions to re-order the non-sequential (that is, non-wavelength sequential) optical signals as presented by the plurality of N laser sources in order for the AWG component to perform the desired multiplexing function. In one embodiment, an apparatus for re-ordering the wavelengths is disposed between the laser sources and the AWG. In another embodiment, an apparatus for re-ordering the wavelengths is disposed at the output of the AWG. In either case, a plurality of N laser array sources can be utilized, with the complete set of optical signals multiplexed onto a single output signal path.

In one configuration of the present invention where an "input" apparatus for re-ordering is used, the output signals from the multiple laser arrays are passed through a waveguide cross-connect section (formed of interleaved waveguides) that re-orders the non-sequential wavelengths so that the signals presented at the input of the AWG are repositioned into the monotonic ordering required to multiplex all of the different wavelength channels onto a single output waveguide at the output of the multiplexer. The waveguide cross-connection section is one type of apparatus for re-ordering the non-sequential optical signals in accordance with the present invention.

In another embodiment of the present invention where an "output" apparatus for re-ordering is used, the optical signals from the multiple laser arrays pass through the AWG as separate groups, retaining the multiple-channel spacing between adjacent signals, each group forming its own multiplexed signal at the output of the AWG. These output signals from the AWG are then coupled together (using, for example, a Mach-Zehnder coupler or other appropriate type of combining configuration) to ultimately be presented on a single output signal path. The Mach-Zehnder coupler as used in this embodiment is another type of apparatus for re-ordering the non-sequential optical signals in accordance with the present invention.

One arrangement of the present invention can be defined as a wavelength division multiplexer that utilizes an optical source in the form of at least two separate laser array components, each laser array component including a group of laser diodes operating at wavelengths that are spaced by a multiple of a pre-defined channel spacing of the multiplexer. This optical source thus generates a plurality of non-sequential optical signals that need to be re-ordered at some point along the signal path so that all of the signals are multiplexed onto a single output signal path. The multiplexer utilizes an arrayed waveguide grating (AWG) to combine the various optical signals, with a specialized apparatus for re-configuring the ordering of the wavelengths of the propagating plurality of N optical signals disposed either at the input or output of the AWG.

Other and further configurations and advantages of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
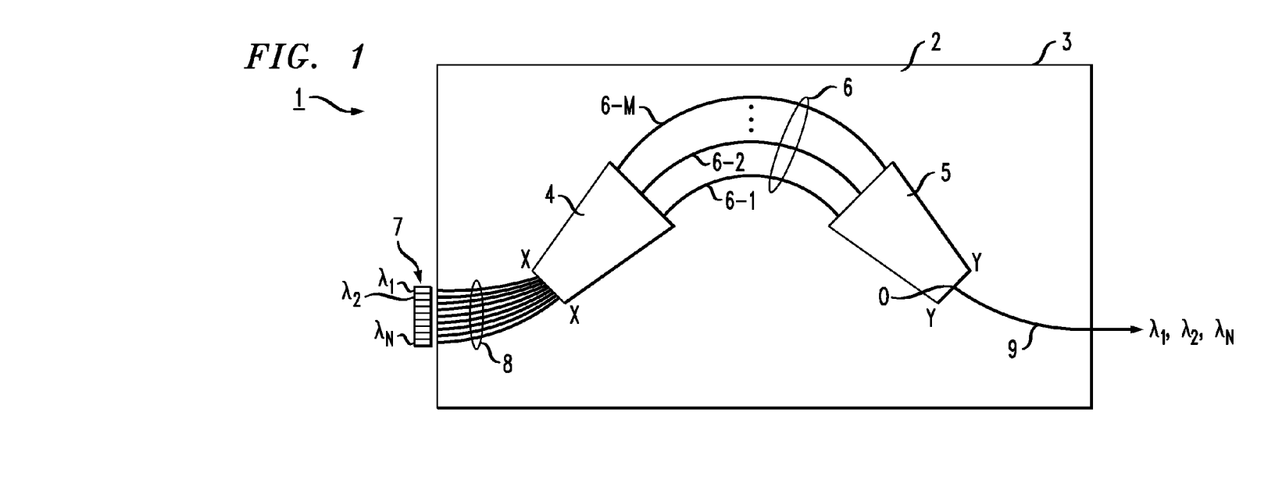
FIG. 1 illustrates an exemplary conventional PLC multiplexer.

Optical multiplexing/demultiplexing operations have been used over the years as communication systems expand the need to send multiple signals, at different wavelengths, over the same infrastructure. An exemplary prior art wavelength division multiplexer (WDM) 1 is shown in FIG. 1 as based upon an arrayed waveguide grating (AWG) 2. In most conventional embodiments, AWG 2 is formed as an integrated arrangement of components, defined as a planar lightwave circuit 3 (PLC 3). As shown, AWG 2 includes an input free space region (FSR) 4 that supports the propagation of optical signals within its planar structure, as well as an output FSR 5 that similarly supports the propagation of optical signals within its structure. A waveguide array 6 comprising a plurality of M separate waveguides is shown as disposed between input FSR 4 and output FSR 5. Referring to FIG. 1, plane X-X at the input to FSR 4 is defined as the "input focal plane" of AWG 2 and plane Y-Y at the output of FSR 5 is defined as the "output focal plane" of AWG 2.

As is well-known in the art, waveguide array 6 functions as a diffraction grating dispersive element, with each individual waveguide 6-1, 6-2, ... 6-M having a different length (with, in most cases, a constant incremental increase in length between adjacent waveguides). This waveguide array arrangement therefore creates a predetermined diffraction pattern across output focal plane Y-Y, based upon the interference (constructive and destructive) experienced by the multiple optical signals propagating at different wavelengths through the system.

In the specific embodiment as shown in FIG. 1, WDM 1 is used to multiplex a plurality of optical signals operating at different wavelengths ($\lambda_1, \lambda_2, \ldots, \lambda_N$) onto a single output signal path. In this case, the plurality of signals is supplied by a monolithic laser array 7 where the plurality of laser devices operating at different wavelengths is integrated into a single, monolithic structure (often referred to as a "bar").

Figure 2:
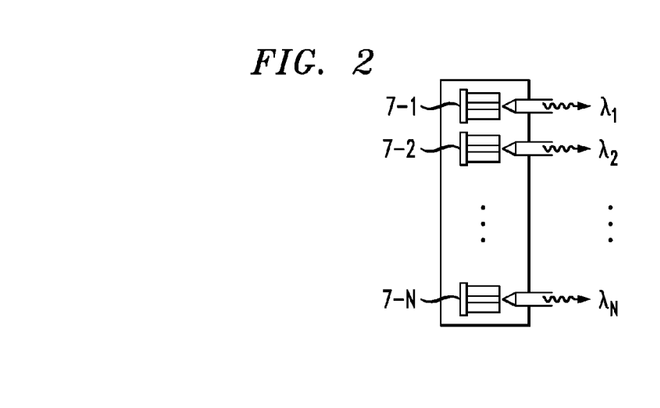
FIG. 2 is a top view of an exemplary optical source for the PLC multiplexer of FIG. 1, the optical source taking the form of a monolithic array of laser diodes (a "laser bar"), arranged in monotonically increasing wavelength order.
Figure 3:
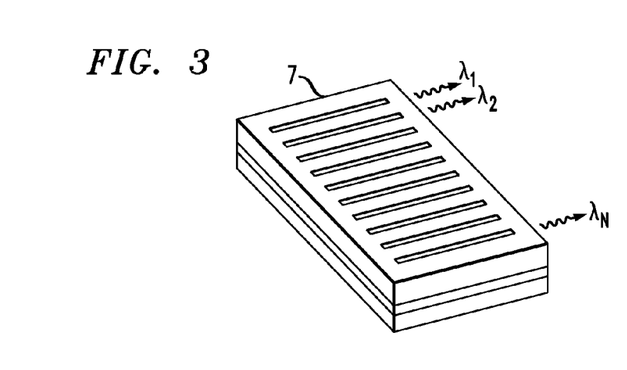
FIG. 3 is an isometric view of the laser bar of FIG. 2.

FIG. 2 is a top view of laser array bar 7, illustrating the separate laser diode sources 7-1, 7-2, ..., 7-N, each fabricated to generate an optical output signal at a different wavelength, the wavelengths progressing monotonically in value, with a defined "spacing" between adjacent wavelengths. In a typical arrangement that satisfies the requirements of industry standards, a "channel spacing" of 100 GHz between adjacent sources is used. FIG. 3 is an isometric view of laser bar 7. The laser bar as shown in FIGS. 2 and 3 is for the purpose of illustration only; any fabrication or configuration details of an exemplary laser array bar is not considered to be germane to the subject matter of the present invention.

Referring back to FIG. 1, the plurality of generated optical signals from laser array bar 7 is then coupled into a plurality of separate optical waveguides 8 and presented to the input of FSR 4 at input focal plane X-X. In accordance with the wavelength dispersion properties of AWG 2, the inputs to FSR 4 need to be presented in a monotonically increasing order, e.g.: $\lambda_1 < \lambda_2 < \ldots < \lambda_N$. These signals spread freely in the transverse dimension as they propagate through input FSR 4 and are thereafter coupled into the plurality of M waveguides forming waveguide array 6. Thereafter, the plurality of signals exiting waveguide array 6 are coupled into output FSR 5. Again, the signals propagate freely through output FSR 5, where the dispersive properties of the waveguide array, in combination with the specific dimensions of FSR 5, results in all of the signals operating at different wavelengths to be imaged onto a single point O along output focal plane Y-Y of output FSR 5. These multiplexed signals are then coupled into a single output optical waveguide 9.

It is to be understood that this structure, being completely passive, is reciprocal in nature. That is, waveguide 9 can be used to introduce a plurality of signals operating at N different wavelengths into FSR 5, where they will be separated upon passing through AWG 2 and appear at the separate waveguides 8-1 through 8-N at focal plane X-X of FSR 4, with each wavelength signal coupled into a separate waveguide.

In most of today's WDM systems, the wavelengths "bands" used for communication have been defined, with the channel spacing within each band also being defined. These definitions have been incorporated into standards mainly under the auspices of the International Telecommunications Union (ITU). In accordance with the ITU standards, a typical system uses a 100 GHz inter-channel spacing (either with multiples of 100 GHz, or at a 50 GHz offset from multiples of 100 GHz). As the demand for ever-increasing transmission rates continues, it is expected that denser channel spacing requirements will emerge (on the order of, for example, 25 GHz).

While the channel spacing is one constraint on the configuration of a WDM such as shown in FIG. 1, the desire to increase the level of integration and reduce the overall size of various components continues as well. For example, it is preferable to utilize a laser array (such as element 7 in FIG. 1) for the input signals, rather than separate, discrete laser diodes, which need to be separately manufactured, positioned, aligned, attached, etc. The limitations of current laser fabrication processes, however, are not able to produce the necessary quantity of laser arrays with the desired channel spacing (e.g., 100 GHz), while maintaining the defined center wavelength of each diode.

The various embodiments of the present invention address these limitations by using a multiple number of laser arrays, with each array formed to exhibit a multiple channel spacing between adjacent laser sources. For example, by using a pair of laser arrays in place of a single array, adjacent laser diodes can be formed to have twice the channel spacing as compared to prior art "single array" arrangements (e.g., 200 GHz channel spacing instead of 100 GHz channel spacing), allowing for somewhat relaxed fabrication tolerances than possible with the prior art. Indeed, it is advantage of the "multiple channel-spaced array" arrangement of the present invention that separating the channels into different groups improves the overall yield of the system. For example, presume a first laser array is configured to provide the "odd" channel wavelength sources and a second array is configured to provide the "even" channel wavelength sources. Then if the first array, as fabricated, is off by one channel spacing (which may be due to fabrication tolerances), then this array can be used as an "even" channel array. In this manner, the need for additional processing to adjust wavelengths (e.g., temperature tuning) is minimized. A yield increase in usable laser array bars on the order of two is well within expected results.

Figure 4:
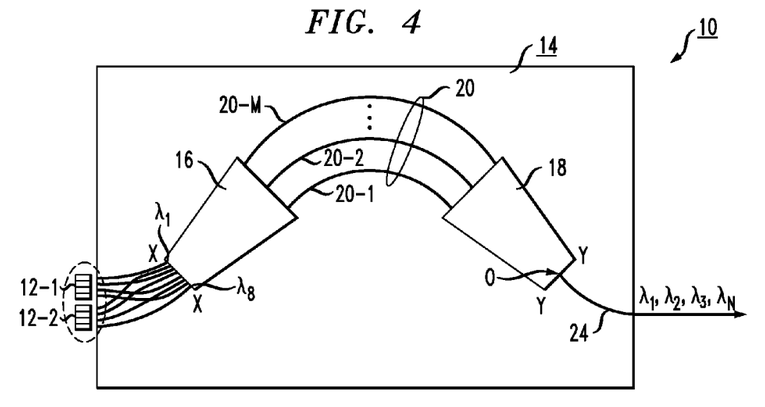
FIG. 4 illustrates one embodiment of the present invention, utilizing an optical source in the form of multiple laser arrays and a waveguide cross-connect section to re-order the inputs to the arrayed waveguide grating (AWG)

FIG. 4 illustrates an exemplary WDM system 10 formed in accordance with the present invention that utilizes a plurality of separate laser array sources in combination with a specialized AWG arrangement to provide wavelength division multiplexing (or, conversely, demultiplexing if a plurality of detectors are used in place of the laser sources, with the multiple inputs then travelling from right to left in the diagram of FIG. 4) in accordance with the present invention. The WDM system is considered to have an industry-defined channel spacing and the specialized AWG arrangement of the present invention is configured to function with a channel spacing that is a multiple of the industry-defined standard.

Referring to FIG. 4, WDM system 10 is shown in this particular embodiment as utilizing a pair of laser array bars 12-1 and 12-2 and a specialized AWG arrangement 14. By using a pair of laser sources, specialized AWG arrangement 14 is configured to function with a channel spacing that is twice the defined standard, as will be described in more detail below (in general, the use of n laser sources permits the AWG channel spacing to be n times the standard for the WDM system).

Figure 5:
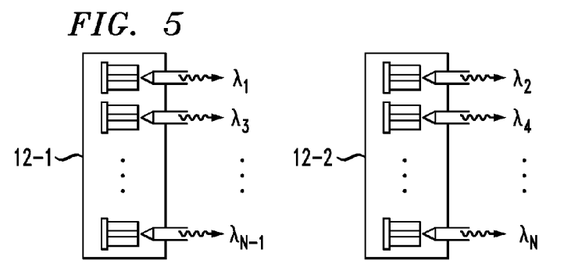
FIG. 5 is a top view of a pair of laser array bars as used for the optical source of FIG. 4, the pair of laser array bars each having a multiple-channel spacing between adjacent laser diodes, creating a set of non-sequential laser output signals.

In this particular embodiment of FIG. 4, and as further shown in detail in FIG. 5, laser array bar 12-1 is formed to include laser diodes that operate at the "odd" wavelength values (i.e., $\lambda_1, \lambda_3, \ldots \lambda_{N-1}$) and laser array bar 12-2 is formed to include laser diodes that operate at the "even" wavelength values (i.e., $\lambda_2, \lambda_4, \ldots \lambda_N$). By separating the wavelengths in this manner, the spacing dλ between adjacent laser diodes is doubled when compared to standard art arrangements that used laser diode arrays with the wavelengths disposed in sequence.

Therefore, with reference to current ITU requirements, a laser array as used in an exemplary configuration of the present invention may have a spacing dλ on the order of ~1.6 nm (equivalent to a channel frequency spacing of about 200 GHz).

In looking at the details of specialized AWG arrangement 14, there are several portions of this arrangement that are similar to those described above in association with FIGS. 1-3. In particular, AWG arrangement 14 comprises a first FSR 16 and a second FSR 18, with a plurality of arrayed waveguides 20 disposed therebetween. As before, the separate waveguides 20-1 through 20-M are formed to have incrementally increasing lengths to create the desired diffraction grating properties. Further, it is a known characteristic of an AWG multiplexer that the diffraction pattern created by the multiple input signals (when applied in sequential wavelength order to the AWG) will all appear at a single location at the exit of the AWG (that is, the same point along output focal plane Y-Y). The dimensions of the various components (FSRs and waveguide array) are configured to ensure this result, using techniques well-known in the art.

Figure 6:
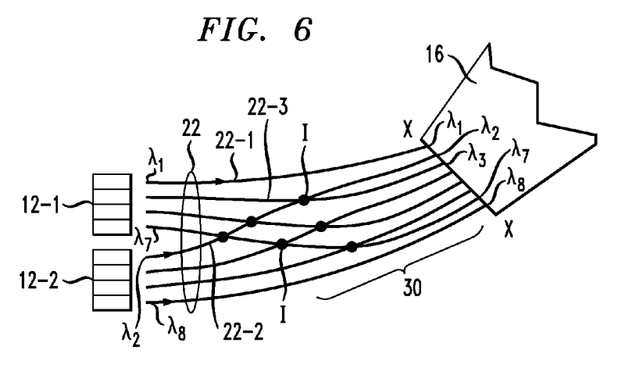
FIG. 6 is an enlarged view of the waveguide cross-connection section of FIG. 4.

The sequential wavelength-ordering requirement is met in the configuration of the present invention as shown in FIG. 4 by using an input element for re-ordering the non-sequential wavelengths, in this example a waveguide cross-connect region 30 that is disposed between the output of laser array bars 12 and the input to first FSR 16. In particular, FIG. 4 illustrates waveguide cross-connect region 30 as comprising a plurality of optical waveguides 22 coupled between the outputs of laser array bars 12 and input focal plane X-X of first FSR 16. FIG. 6 is an enlarged view of waveguide cross-connect region 30, showing in particular the paths of each individual waveguide 22 between laser array bars 12-1, 12-2 and input plane XX of first FSR 16. In accordance with this "input element" for re-ordering embodiment of the present invention, waveguide 22-2 (which carries the signal operating at 2c2 from laser array bar 12-2) is curved within cross-connect region 30 to follow a path such that it terminates at input focal plane X-X in a position between waveguides 22-1 and 22-3 (from laser array bar 12-1).

Thus, waveguide cross-connect region 30 functions as one specific apparatus for re-ordering the non-sequential optical signals in accordance with the present invention, providing the various cross-overs required such that the wavelengths appear in sequential order at input focal plane X-X, regardless of where they originated at the various laser array bar inputs. Inasmuch as the various waveguides forming cross-connect region 30 intersect at angles, the interference between "crossing" signals is minimal.

By virtue of re-ordering the waveguides within cross-connect region 30 such that the plurality of wavelengths are sequentially arranged at input focal plane X-X, all of the signals will appear at point O of output focal plane Y-Y (creating a set of multiplexed signals). The multiplexed signals as appearing at point O are then coupled into a single output waveguide 24, forming the final multiplexer output optical signal, as shown in FIG. 4.

While this arrangement is useful in providing the desired multiplexing function with relaxed tolerances on the laser arrays, there are situations where the inclusion of an input waveguide cross-connect region as the wavelength re-ordering apparatus is not feasible. For instance, the utilization of a waveguide cross-connect region at the input of the AWG may take up too much space, introduce unwanted signal loss into the arrangement, etc.

Figure 7:
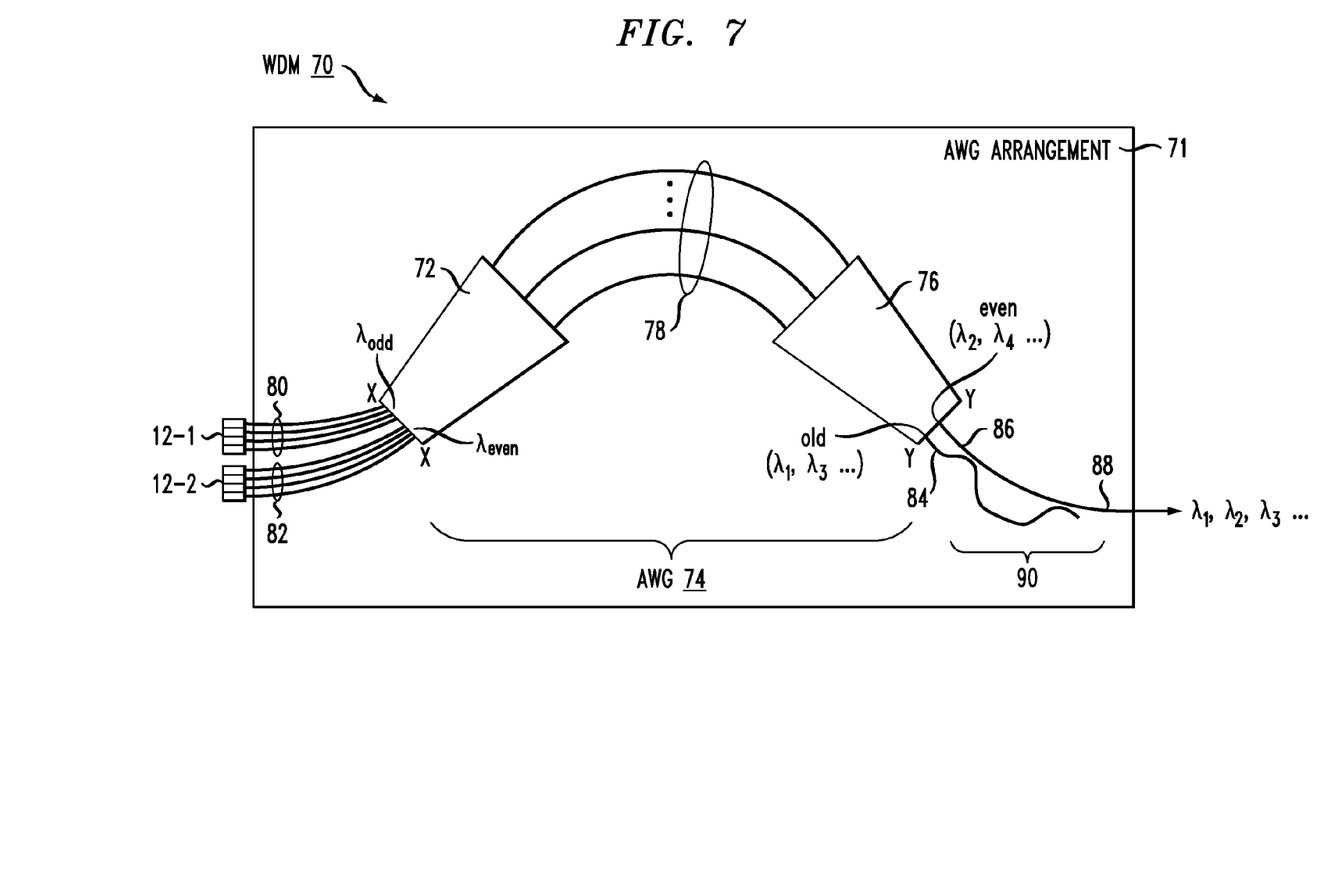
FIG. 7 illustrates an alternative embodiment of the present invention, with the multiple laser arrays of the optical source directly coupled to the input of the AWG, using a directional coupler-based Mach Zehnder coupler at the output of the AWG to re-configure the propagating signals and combined them onto the signal output signal path.

In another embodiment of the present invention, as shown in FIG. 7, the need for an input cross-section section is eliminated, and an "output" element for re-ordering the non-sequential signals is utilized. In this configuration of a WDM 70, the input signals from each laser bar array 12-1 and 12-2 are applied as a separate grouping of inputs to AWG arrangement 71. These inputs are presented at input focal plane X-X of a first FSR 72 of an AWG 74. Each grouping of signals (also referred to at times herein as a "cluster") propagates through AWG 74 independently of the other clusters, with each cluster appearing at a separate, spaced-apart location along output focal plane Y-Y of a second FSR 76. A waveguide array 78, comprising a plurality of M waveguides is shown as disposed between first FSR 72 and second FSR 76, providing the desired diffraction grating function of the arrangement.

As with the embodiment of the present invention described above in association with FIG. 4, laser array bars 12-1 and 12-2 are used to provide the input signals to WDM 70, with bar 12-1 providing the "odd" wavelength channel inputs and bar 12-2 providing the "even" wavelength channel inputs. In contrast to the arrangement shown in FIG. 4, the odd wavelength signals from bar 12-1 are coupled into a first cluster of waveguides 80 of AWG arrangement 71, which are formed in a conventional, non-crossing configuration as shown in FIG. 7. Thus, the cluster of input signals operating at wavelengths $\lambda_1, \lambda_3, \ldots, \lambda_{N-1}$ (collectively, $\lambda_{odd}$) appear in a first sequence along input focal plane X-X of first FSR 72. This sequence thus exhibits twice the channel spacing when compared to the configuration of FIG. 4.

In a similar fashion, laser array bar 12-2 is shown as creating signals at wavelengths $\lambda_2, \lambda_4, \ldots, \lambda_N$, which are thereafter coupled into a second cluster of waveguides 82 of AWG arrangement 71 and provided as a second sequence of (double channel-spaced) input signals (collectively, $\lambda_{even}$) along input focal plane X-X of first FSR 72. As shown, the positioning of second cluster $\lambda_{even}$ is spaced apart from the location of first cluster $\lambda_{odd}$. Additionally, in accordance with this embodiment of the present invention, the dimensions of AWG 74 are reduced when compared to the dimensions of AWG 14, as a result of the double-channel spacing between adjacent wavelength signals. This is obviously an additional benefit of this embodiment, since physical "space" in any type of integrated circuit arrangement is always at a premium.

In applying the known properties of an AWG, the set of signals associated with the "odd" channels will all appear at a first output location along output focal plane Y-Y of second FSR 76. This location is designated "odd" at output focal plane Y-Y. The plurality of multiplexed signals appearing at this location is thereafter coupled into a first output waveguide 84. The set of signals associated with the "even" channels will similarly propagate through AWG 74, and in this case will appear at a separate (single) location along output focal plane Y-Y (designated "even") as a multiplexed group of signals. As shown, this multiplexed group of signals is thereafter coupled into a second output waveguide 86.

In accordance with this embodiment of the present invention, the apparatus for re-ordering the non-sequential signals such that all of the output signals are ultimately multiplexed onto a single output waveguide 88 is provided by a Mach-Zehnder (MZ) coupler 90. As shown, MZ coupler 90 uses as separate inputs the pair of waveguides 84, 86 appearing at the output of second FSR 76. The functioning of an MZ coupler is well-known in the industry and the specifics of how it provides coupling are not required to be described for an understanding of the principles of the present invention.

In accordance with this embodiment of the present invention, the "odd" wavelength signals propagating along waveguide 84 and the "even" wavelength signals propagating along waveguide 86 are applied as separate inputs to MZ coupler 90. The differential length between waveguides 92 and 94 within MZ coupler 90 functions to combine the signals in a sequential manner, coupling these signals onto the single output waveguide 88 of WDM 70.

Thus, as shown in the embodiment of FIG. 7, laser bars with multiple-channel spacing may be directly used as inputs to an AWG (that is, without the need for a waveguide cross-connect feature), with a "post-AWG" output re-ordering element (such as an MZ coupler) used to provide the ultimate combining of all signals onto one waveguide. It is also possible to modify the physical topology of MZ coupler 90 (e.g., routed around the chip used to form the PLC arrangement) to minimize any impact on the ultimate "size" of the hybrid integrated WDM. Further, inasmuch as this is a passive optical arrangement that may be used in reciprocal fashion, an optical demultiplexer is created by coupling all wavelengths into waveguide 88, where they will then pass through MZI 90 (which functions as a "splitter" in this case), with the odd and even wavelengths provided as groups of separate inputs to second FSR 76.

As mentioned above, another advantage of this embodiment is that the fabrication process for the AWG elements is more tolerant to variations, since a double-channel spacing is defined between adjacent input signals. Process variations often result in an AWG peak transmission wavelength that is offset from the defined, predetermined WDM operating system wavelengths (i.e., the wavelengths on the "grid"). Since the transmission peak widths (i.e., the 1 dB transmission width) scales with the wavelength channel spacing (with all other parameters remaining the same), the effect of a given wavelength offset results in a smaller transmission loss penalty that that associated with a prior art "single" channel-spaced arrangement.

Figure 8:
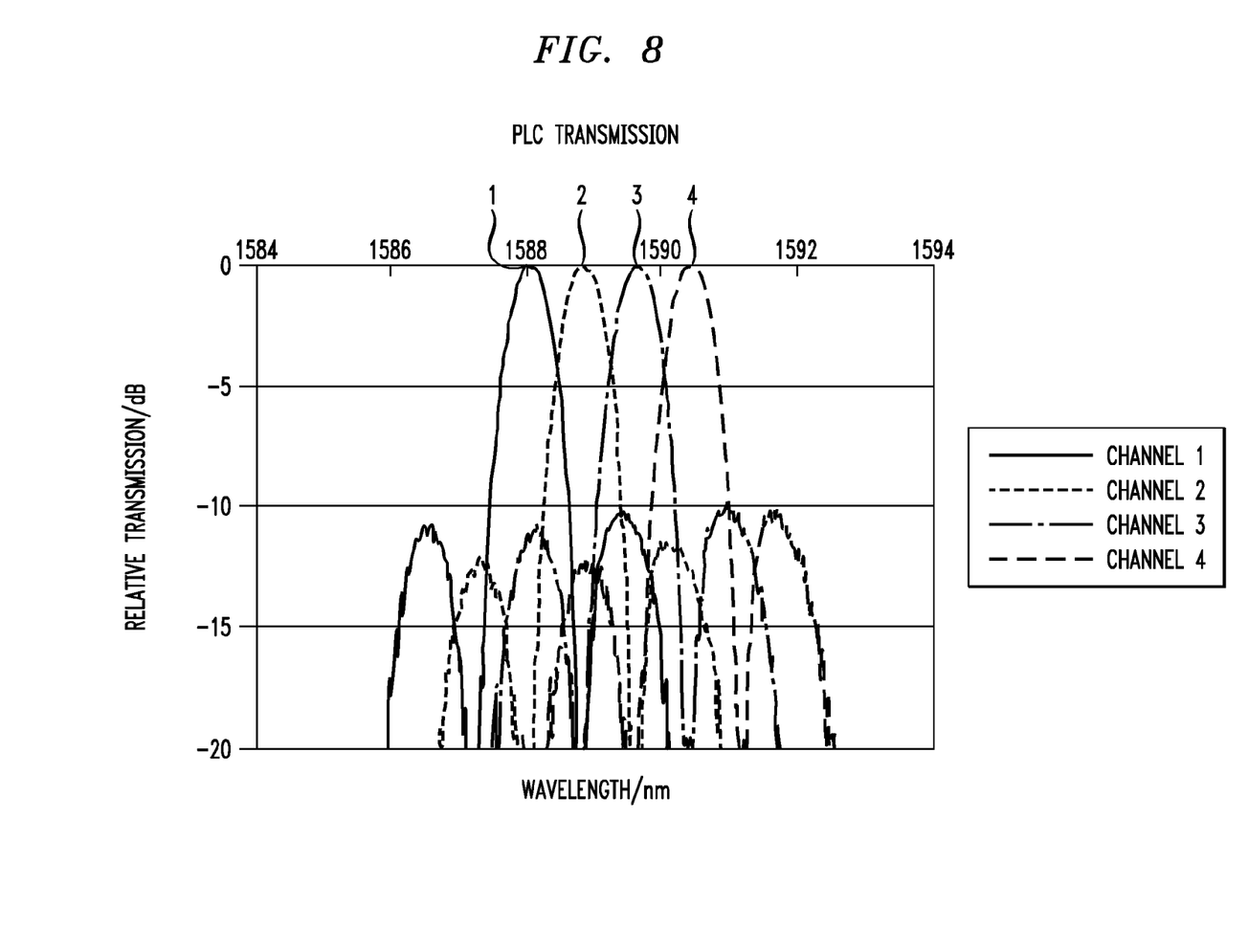
FIG. 8 is a graph of transmission spectra for a four-channel arrangement of the present invention as shown in FIG. 7.

The transmission performance of an exemplary PLC WDM implemented in accordance with the embodiment of FIG. 7 is shown in FIG. 8. In this example, the PLC multiplexer operates on WDM channels separated by the pre-defined 100 GHz (~0.8 nm) in the 1.55-1.60 μm wavelength band. In accordance with the "double" spacing embodiment of FIG. 7, therefore, the laser wavelengths on each bar array 12-1 and 12-2 are separated by about 1.6 nm (i.e., 200 GHz), and also offset by 100 GHz between the two arrays. In this case, AWG 74 is formed to exhibit a channel spacing of 200 GHz. Presuming that each array includes a pair of laser sources (laser array 12-1 including signals operating at $\lambda_1$ and $\lambda_3$; laser array 12-2 including signals operating at $\lambda_2$ and $\lambda_4$), this can be defined as a four channel multiplexer (channels 1, 2, 3 and 4). AWG 74 thus functions to multiplex channels 1 and 3 onto the "odd" output location along plane Y-Y, coupling these signals into waveguide 84. Similarly, AWG 74 functions to multiplex channels 2 and 4 onto the "even" output location and couple into waveguide 86. Waveguides 84 and 86 are used as the inputs to MZ coupler 90, which operates with a free spectral range of 200 GHz (and has a transmission that is synchronized with AWG 74). MZ coupler 90 then multiplexes channels 1 and 3 with channels 2 and 4, providing all four channels along output waveguide 88.

FIG. 8 records the optical transmission measured from output waveguide 88. It is seen that the arrangement of the present invention as shown in FIG. 7 effectively multiplexes the set of four channels, with their respective peak transmissions separated by the desired 100 GHz (0.8 nm) amount. It is evident from the spectra in FIG. 8 that a small offset in the wavelength of the AWG peak transmission (as possible from typical fabrication variations) has only a modest effect on the overall transmitted power of the channel signal, since the MZ coupler is now the dominant filter element governing peak transmission wavelength. Additionally, a finer control of the transmission wavelengths from the MZ output can be achieved by post-processing methods well-known in the art as associated with interferometers.

Figure 9:
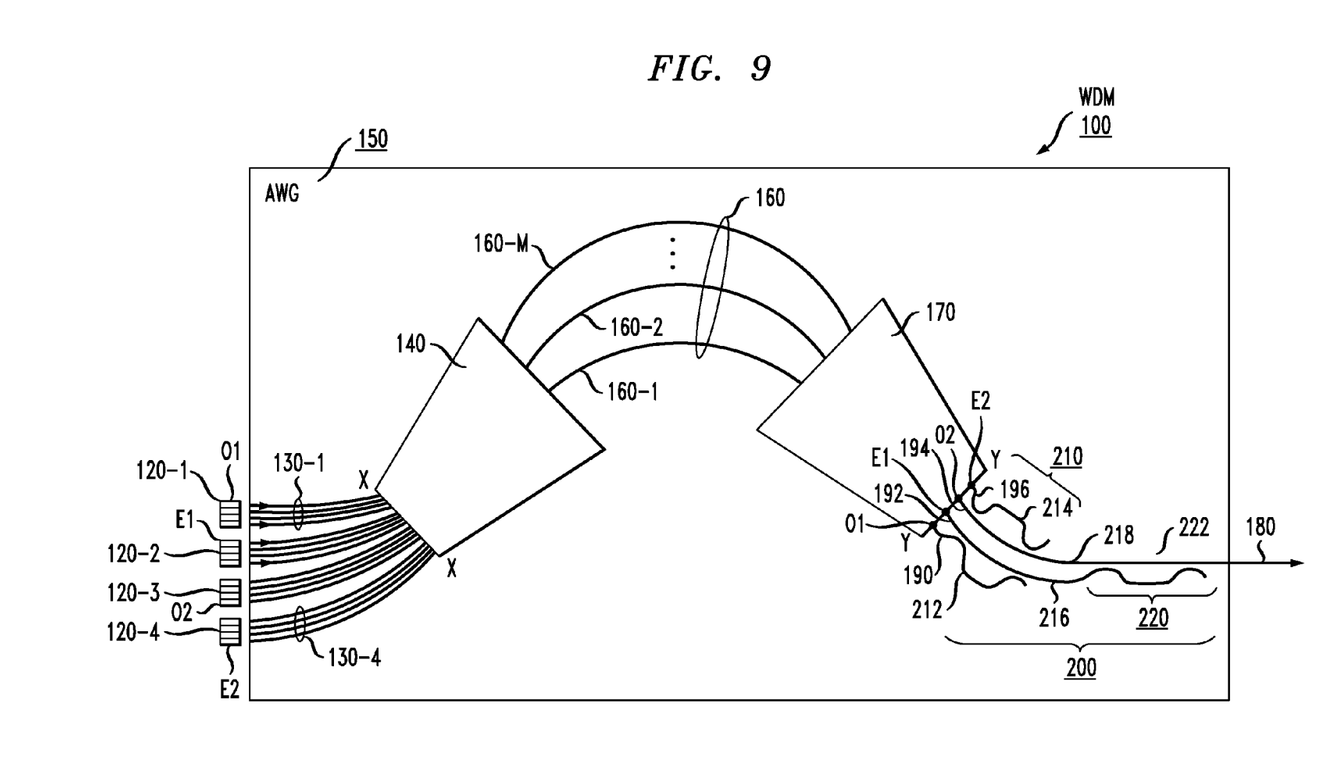
FIG. 9 illustrates yet another embodiment of the present invention, in this case using a set of four separate laser arrays as the input source, and a multi-stage directional coupler at the output of the AWG.

FIG. 9 illustrates yet another embodiment of the present invention, where in this case a WDM 100 utilizes a set of four separate laser bar arrays, designated as 120-1, 120-2, 120-3 and 120-4. By separating a given set of wavelengths across a set of four bars, an even larger multiple channel spacing can be accommodated (thus further relaxing the fabrication tolerances on the laser arrays themselves). In this particular configuration, first laser array bar 120-1 is shown as associated with a "first" set of odd wavelengths O1, second laser array bar 120-2 generates a "first" set of even wavelengths E1, third laser array bar 120-3 generates a "second" set of odd wavelengths O2 and fourth laser array bar 12-4 generates a "second" set of even wavelengths E2.

Figure 10:
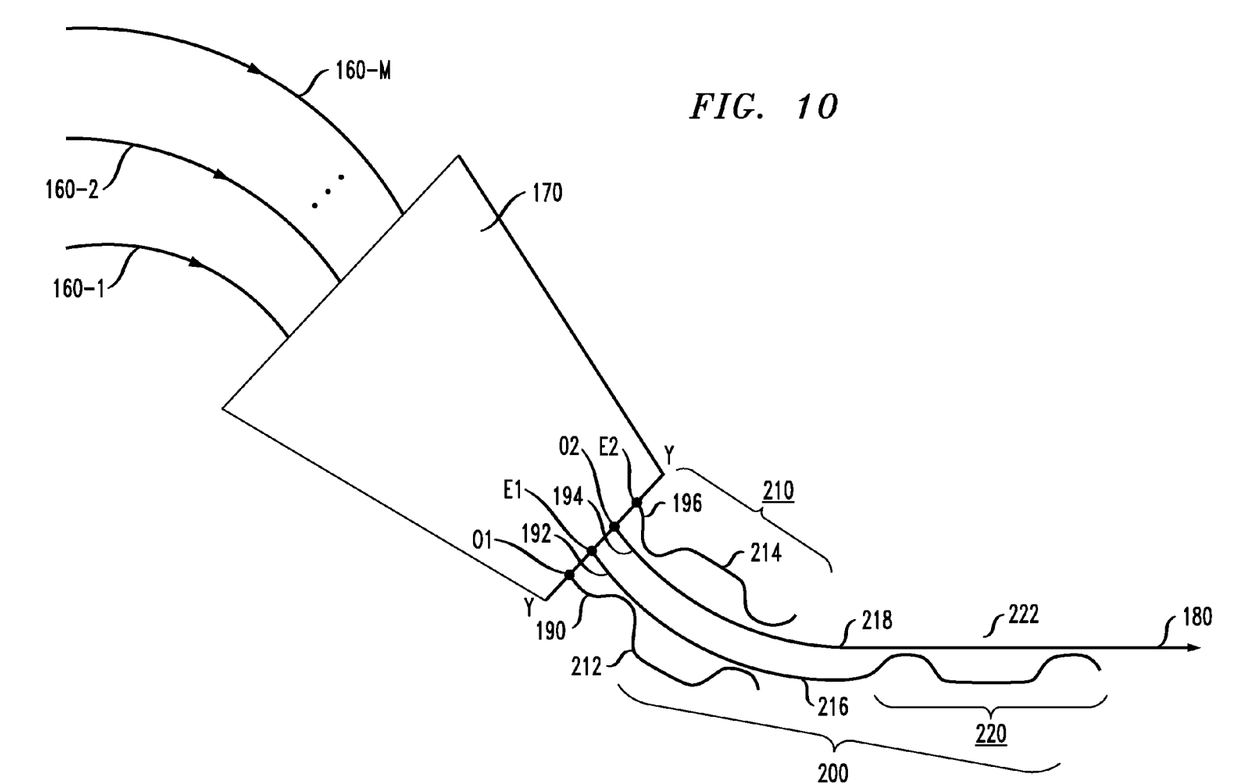
FIG. 10 is an enlarged view of the multi-stage directional coupler output of the embodiment of FIG. 9.

Each laser array bar 120 is shown as coupling into its own set of waveguides 130, each waveguide set disposed in a non-overlapping conventional fashion and appearing as four separate clusters of inputs at input focal plane X-X of first FSR 140 of an AWG 150. The signals proceed through a plurality of M waveguides 160 and appear along output focal plane Y-Y of a second FSR 170. In this case, it is shown that the signals appear at four separate locations (O1, E1, O2 and E2) along output focal plane Y-Y. Therefore, a two-stage MZ coupler 200 is used in this application in order to ultimately couple all of the signals onto a single output waveguide, shown as output waveguide 180 in FIG. 9. FIG. 10 is an enlarged view of the output region of WDM 100 of FIG. 9. Both FIGS. 9 and 10 can be referenced with the following discussion.

Two-stage MZ coupler 200 is shown as including a first stage 210 of that includes two separate MZ couplers, shown as 212 and 214. The multiplexed signals associated with the first set of odd and even wavelengths (O1 and E1, respectively) are coupled into a first pair of waveguides 190 and 192 at output focal plane Y-Y of second FSR 170. Waveguides 190 and 192 are used as the inputs to first MZ coupler 212, where MZ coupler 212 then multiplexes this first group of odd and even wavelengths onto an output waveguide 216 of first MZ coupler 212. Similarly, the second set of odd and even wavelengths (O2 and E2, respectively) are coupled into a second pair of waveguides 194 and 196 at output focal plane Y-Y of second FSR 170. Waveguides 194 and 196 are then used as the inputs to second MZ coupler 214. These signals are then multiplexed and appear along an output waveguide 218 from second MZ coupler 214.

As best shown in FIG. 10, waveguides 216 and 218 are used as the inputs to a second stage 220 of two-stage MZ coupler 200. The multiplexed signals propagating along waveguide 216 are associated with a "first" group of signals (at a first, perhaps lower, group of wavelengths) and the multiplexed signals propagating along waveguide 218 are associated with a "second" group of signals (at a second, perhaps higher, group of wavelengths). Second stage 220 is shown as comprising a third MZ coupler 222, which then multiplexes all of the signals appearing at input waveguides 216, 218 onto the single WDM output waveguide 180.

While these various embodiments are considered to be exemplary of the present invention and illustrating the best mode known at this time, it is to be understood that different numbers of laser arrays may be used as the input, with different multiple channel spacings; using in any case a described apparatus for re-ordering the non-sequential wavelengths in a manner that allows for all of the signals introduced into a WDM to appear at along a single output path. The re-ordering apparatus may comprise a waveguide cross-connection rearrangement disposed at the input to an AWG, an MZ coupler (or other suitable type of wavelength interleaver) disposed at the output of an AWG, or, perhaps a combination of both an input rearrangement and an output interleaver. Broadly speaking, the use of an MZ coupler as a configuration for re-ordering non-sequential signals may take a variety of forms to implement two waveguide coupling regions connected by a pair of waveguides having different lengths. The waveguide coupling regions are conveniently implemented as "directional couplers" (which are regions in which waveguides lie parallel and relatively close to one another such that the fields within them overlap and interact, providing evanescent coupling). For the purposes of the present invention, the term "MZ coupler" is considered to include this arrangement, as well as others, such as a multimode interference coupler, or MMI. As long as the coupling arrangement is capable of re-ordering non-sequential wavelength signals, it is used for the purposes of the present invention.

Moreover, it is to be understood that the principles of the present invention equally apply to creating a wavelength division demultiplexer, where a stream of input signals at multiple wavelengths are divided out onto separate and distinct output signal paths (each supporting a separate wavelength signal).

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A wavelength division multiplexer for coupling a plurality of N optical signals, each operating at a different wavelength $\lambda_1, \lambda_2, \ldots, \lambda_N$ onto a single output signal path, the multiplexer having a pre-defined channel spacing and comprising an optical signal source including at least two separate laser array components, each laser array component including a group of laser diodes, with adjacent laser diodes operating at wavelengths spaced by a multiple of the pre-defined channel spacing to form a non-sequential grouping of transmission wavelengths on each laser array component;

an arrayed waveguide grating assembly for receiving as an input the plurality of N optical signals and multiplexing the different wavelengths as the plurality of N optical signals propagate through the arrayed waveguide grating assembly, the arrayed waveguide grating assembly defined as having a plurality of N input ports and at least one output port; and an apparatus for re-ordering the wavelengths of the propagating plurality of N optical signals such that the plurality of N input signals are monotonically sequenced to be multiplexed onto the single output port of the wavelength division multiplexer.

2. The multiplexer as defined in claim 1 wherein the apparatus for re-ordering comprises an input element for re-ordering disposed between the optical signal source and the arrayed waveguide grating assembly.

3. The multiplexer as defined in claim 2 wherein the input element for re-ordering comprises waveguide cross-connect region disposed between the optical signal source and the arrayed waveguide grating assembly, the waveguide cross-connect region including a plurality of N waveguides coupled between the plurality of N non-sequential outputs of the laser array components and the plurality of N input ports of arrayed waveguide grating assembly, the plurality of N waveguides interleaved in a manner such that the plurality of N optical signals appear in a monotonically sequenced wavelength ordering along the plurality of N input ports to the arrayed waveguide grating assembly, the arrayed waveguide grating assembly formed to comprise a single output port, with the multiplexer single output waveguide coupled to the single output port.

4. The multiplexer as defined in claim 1 wherein the apparatus for re-ordering comprises an output element for re-ordering disposed between the output of the arrayed waveguide grating assembly and the single output port.

5. The multiplexer as defined in claim 4 wherein each separate laser array component is directly coupled to the arrayed waveguide grating assembly such that the plurality of N input ports are coupled to non-sequential wavelength signals, separated by the multiple channel spacing of each laser array component, each laser array component creating a separate, multiplexed signal, with each separate multiplexed signal appearing at a separate output port of the arrayed waveguide grating assembly, the output element for re-ordering comprising
 a Mach-Zehnder (MZ) coupler coupled to the output ports of the arrayed waveguide grating assembly for receiving the separate, multiplexed signals and combining these separate, multiplexed signals onto the single output signal path of the multiplexer.

6. The multiplexer as defined in claim 5 wherein the MZ coupler comprises a directional coupler-based MZ coupler.

7. The multiplexer as defined in claim 5 wherein the MZ coupler comprises a multimode interference-based (MMI) coupler.

8. The multiplexer as defined in claim 5 wherein the optical signal source comprises a pair of laser array components, creating a pair of separate, multiplexed signals at the output of the arrayed waveguide grating assembly, and the output element for re-ordering comprises a single-stage MZ coupler.

9. The multiplexer as defined in claim 8 wherein the pre-defined channel spacing is 100 GHz and the channel spacing on each laser array is 200 GHz, with a 100 GHz offset between the pair of laser array components.

10. The multiplexer as defined in claim 1 wherein the arrayed waveguide assembly comprises
 an input free space region including a plurality of N input ports and a plurality of M output ports, with a free space region therebetween for allowing the propagation of the plurality of N optical signals;
 an output free space region including a plurality of M input ports and at least one output port, with a free space region therebetween for allowing the propagating of the plurality of N optical signals; and
 a plurality of M arrayed optical waveguides disposed between the plurality of M output ports of the input free space region and the plurality of M input ports of the output free space region, each waveguide having a different length such that the plurality of N optical signals propagating at the plurality of N wavelengths are coupled into a single output signal path of the multiplexer.

11. The multiplexer as defined in claim 10 wherein the apparatus for re-ordering comprises an input element for re-ordering coupled to the plurality of N input ports of the input free space region.

12. The multiplexer as defined in claim 11 wherein the input element for re-ordering comprises a waveguide cross-connect region disposed between the optical signal source and the input free space region, the waveguide cross-connect region including a plurality of N waveguides coupled between the plurality of N non-sequential outputs of the laser array components and the plurality of N input ports of input free space region, the plurality of N waveguides routed in a manner such that the plurality of N optical signals appear in sequential wavelength ordering along the plurality of N input ports to the input free space region, and the output free space region of the arrayed waveguide grating assembly is formed to comprise a single output port, with the output free space region output port coupled to the single output signal path of the multiplexer.

13. The multiplexer as defined in claim 10 wherein the apparatus for re-ordering comprises an output element for re-ordering coupled between the output of the output free space coupling region and the single output signal path of the multiplexer.

14. The multiplexer as defined in claim 13 wherein the separate laser array components are directly coupled to the plurality of N input ports of the input free space region, each laser array component creating a separate, multiplexed signal along a separate output port of the output free space region, and the output element for re-ordering comprises at least one MZ coupler coupled to the output ports of the output free space region for receiving the separate, multiplexed signals and combining these separate, multiplexed signals onto the single output signal path of the multiplexer.

15. The multiplexer as defined in claim 1 wherein the arrayed waveguide grating assembly and the apparatus for re-ordering are integrated within a common substrate and formed as a planar lightwave circuit (PLC).

16. An apparatus including an arrayed waveguide grating (AWG) comprising
 a first free space region including a plurality of N ports at a first termination and a plurality of M ports at a second, opposing termination, the first free space region for supporting the propagation of optical signals;
 a second free space region including a plurality of M ports at a first termination;
 an array of M waveguides disposed between and coupled to the respective pluralities of M ports associated with the first and second free space regions; and
 an apparatus for re-ordering the wavelength sequence of non-sequential wavelength optical signals passing through the apparatus into a monotonic wavelength order such that the apparatus functions as either a wavelength division multiplexer or a wavelength division demultiplexer, as the case may be.

17. The apparatus as defined in claim 16 wherein the apparatus for re-ordering comprises an input re-ordering element coupled to the plurality of N ports input to the first free space region.

18. The apparatus as defined in claim 17 wherein the input re-ordering element comprises a waveguide cross-connection region for re-ordering a set of non-sequential input optical signals into a monotonic wavelength order.

19. The apparatus as defined in claim 16 wherein the apparatus for re-ordering comprises an output re-ordering element coupled to the output ports of the second free space region.

20. The apparatus as defined in claim 19 wherein the second free spacing region comprises at least two separate ports disposed at a second, opposing termination and the output element for re-ordering comprises at least one MZ coupler coupled to the at least two separate ports of the second free space region.

21. The apparatus as defined in claim 16 wherein the apparatus is formed as a planar lightwave circuit.

\* \* \* \* \*